(12) United States Patent
Wentink

(10) Patent No.: US 8,144,676 B2
(45) Date of Patent: Mar. 27, 2012

(54) NETWORK ALLOCATION

(75) Inventor: Maarten Menzo Wentink, Utrecht (NL)

(73) Assignee: Conexant Systems, Inc., Newport Beach, CA (US)

( * ) Notice: Subject to any disclaimer, the term of this patent is extended or adjusted under 35 U.S.C. 154(b) by 908 days.

(21) Appl. No.: 12/106,878

(22) Filed: Apr. 21, 2008

(65) Prior Publication Data

US 2009/0059824 A1   Mar. 5, 2009

Related U.S. Application Data

(60) Provisional application No. 60/969,847, filed on Sep. 4, 2007.

(51) Int. Cl.
*H04W 74/08* (2009.01)

(52) U.S. Cl. .......................................... 370/338; 370/447

(58) Field of Classification Search .................. None
See application file for complete search history.

(56) References Cited

U.S. PATENT DOCUMENTS

| | | | |
|---|---|---|---|
| 6,977,944 B2 | 12/2005 | Brockmann et al. | |
| 7,046,650 B2 | 5/2006 | Sherman et al. | |
| 7,321,762 B2 | 1/2008 | Hoeben | |
| 7,496,076 B2 * | 2/2009 | Takagi et al. | 370/338 |
| 7,656,854 B2 | 2/2010 | Benveniste | |
| 7,801,096 B2 * | 9/2010 | Myles et al. | 370/338 |
| 7,881,313 B2 * | 2/2011 | Scherzer et al. | 370/401 |
| 2003/0133469 A1 | 7/2003 | Brockmann et al. | |
| 2004/0071154 A1 | 4/2004 | Wentink | |
| 2004/0085992 A1 | 5/2004 | Wentink | |
| 2004/0085993 A1 | 5/2004 | Wentink | |
| 2005/0058151 A1 * | 3/2005 | Yeh | 370/445 |
| 2006/0092885 A1 | 5/2006 | Brockmann et al. | |
| 2007/0115853 A1 | 5/2007 | Wentink | |
| 2007/0115882 A1 | 5/2007 | Wentink | |
| 2007/0133447 A1 | 6/2007 | Wentink | |
| 2007/0226351 A1 * | 9/2007 | Fischer et al. | 709/227 |
| 2008/0130603 A1 | 6/2008 | Wentink et al. | |

OTHER PUBLICATIONS

IEEE Standard for Information technology-Telecommunications and information exchange between systems-Local and metropolitan area networks-Specific requirements, Part 11: Wireless LAN Medium Access Control (MAC) and Physical Layer (PHY) Specifications, Jun. 12, 2007, IEEE Computer Society, IEEE Std. 802.11-2007.
Response to an Office Action filed with the Korean Patent Office on Jul. 27, 2011, Korean Application No. 10-2010-7007307.
Preliminary Amendment filed with the Korean Patent Office on Jul. 27, 2011, Korean Application No. 10-2010-7007307.

* cited by examiner

*Primary Examiner* — Kwang B Yao
*Assistant Examiner* — Alex Skripnikov
(74) *Attorney, Agent, or Firm* — Jackson Walker L.L.P.; Christopher J. Rourk

(57) ABSTRACT

Included are embodiments for network allocation. More specifically, one embodiment of a method includes receiving, at a first communications device, without a prior RTS signal being sent, a first clear to send (CTS) signal from a second communications device, addressed to the first communications device, the CTS signal indicating a data exchange duration and sending a second CTS signal, from the first communications device, to the second communications device.

20 Claims, 7 Drawing Sheets

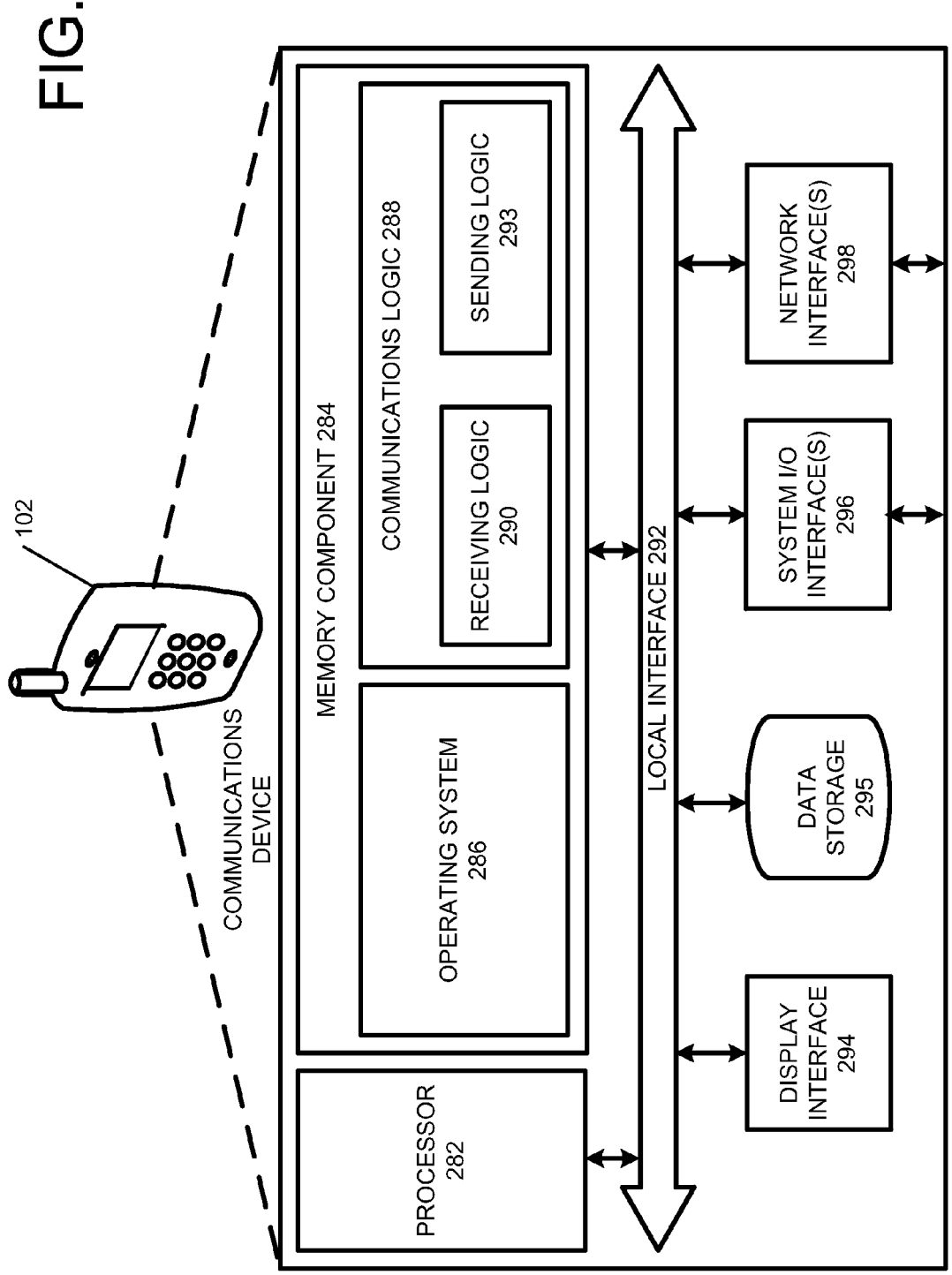

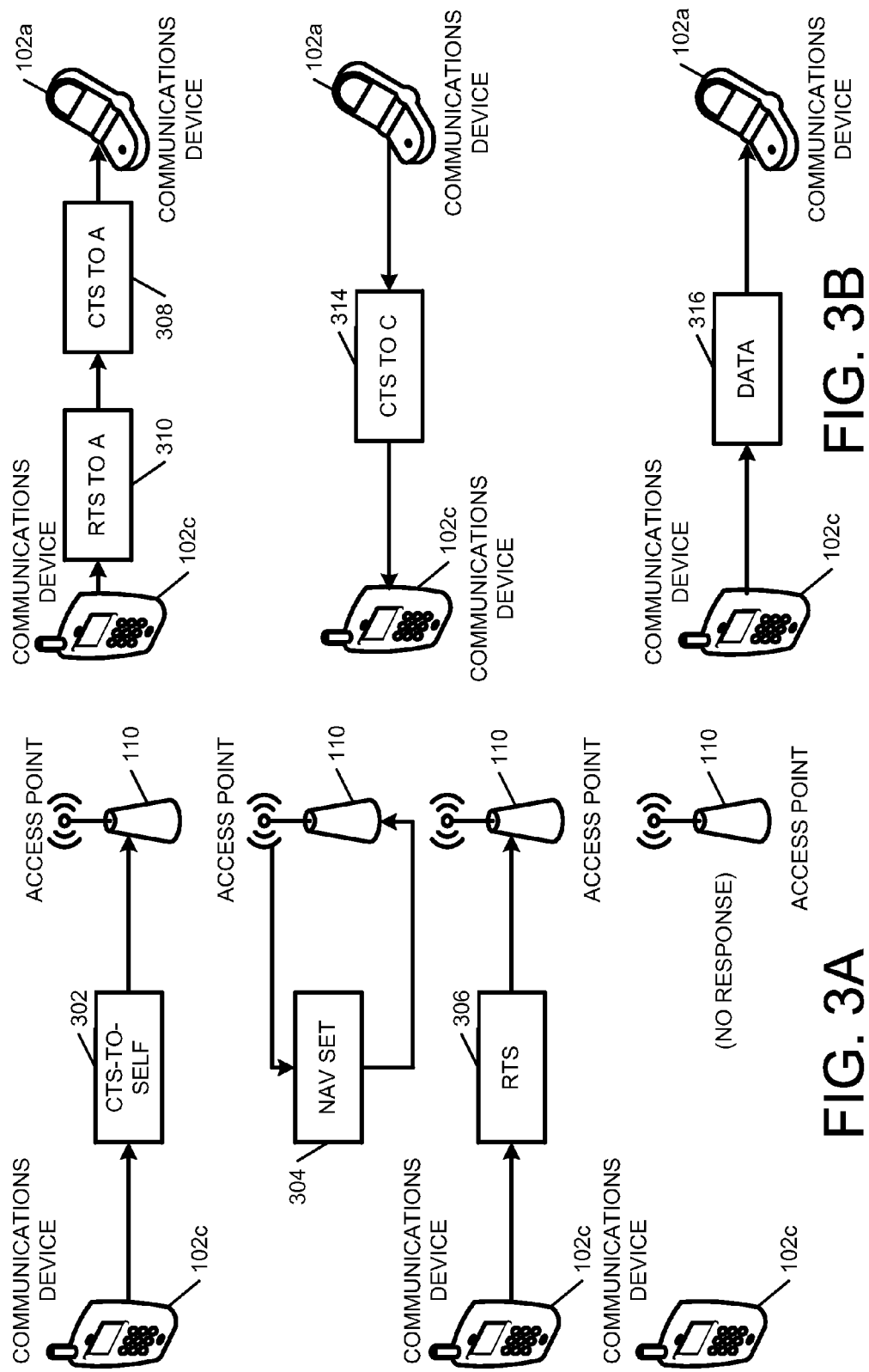

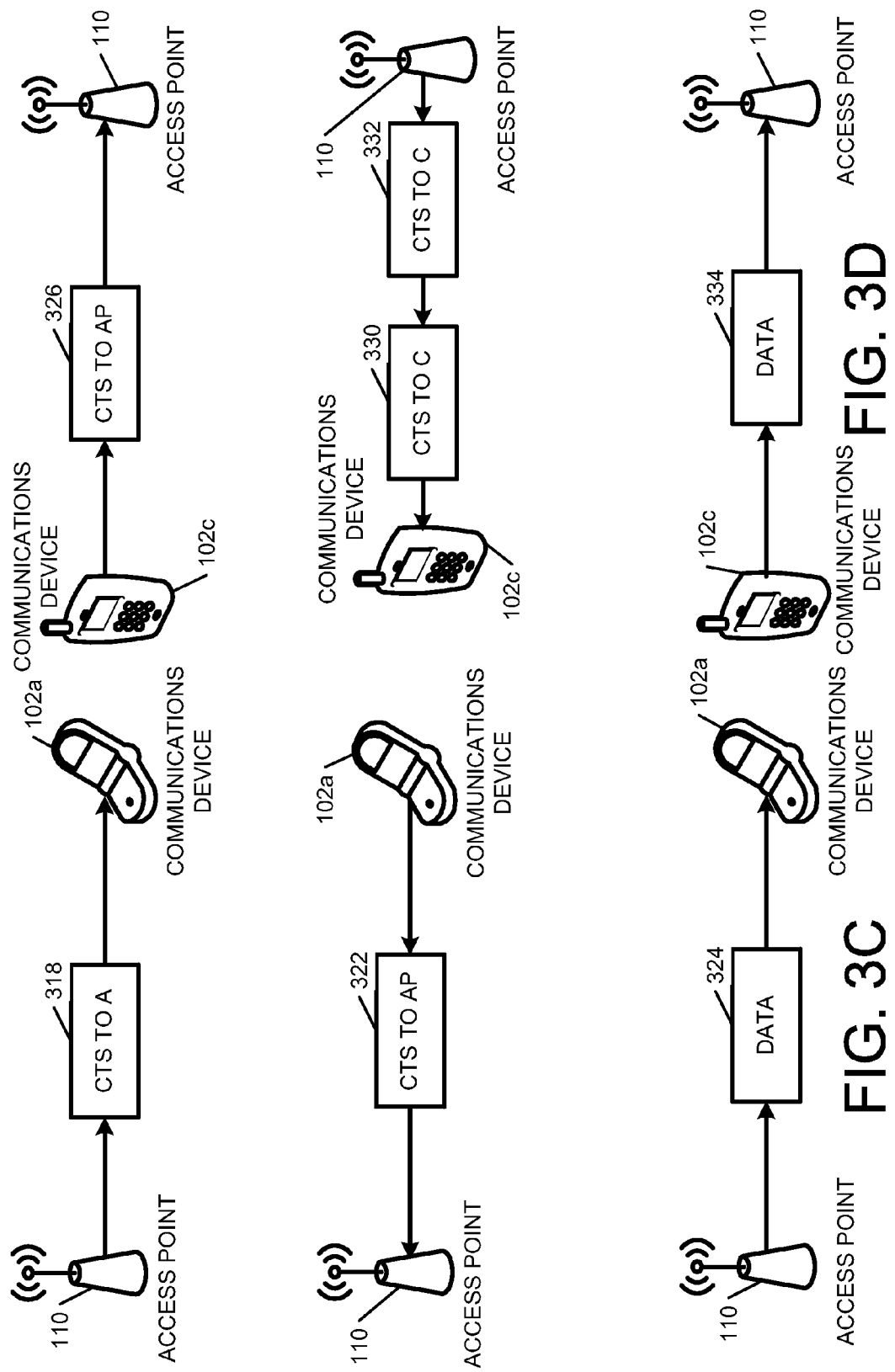

NETWORK ALLOCATION

CROSS REFERENCE

This application claims the benefit of U.S. Provisional Application No. 60/969,847, filed Sep. 4, 2007, which is incorporated by reference in its entirety.

BACKGROUND

As wireless communications have increased, utilization of IEEE 802.11 protocols has also increased. In IEEE 802.11 communications a network allocation vector (NAV) may be utilized to reduce the probability of interference. However, according to the IEE 802.11 protocol, a NAV that is updated by a request to send (RTS) message may be undesirably reset by receivers if a valid physical layer (PHY) header is not received within a certain timeout.

SUMMARY

Included are embodiments for network allocation. More specifically, one embodiment of a method includes receiving, at a first communications device, without a prior RTS signal being sent, a first clear to send (CTS) signal from a second communications device, addressed to the first communications device, the CTS signal indicating a data exchange duration and sending a second CTS signal, from the first communications device, to the second communications device.

Additionally, embodiments of a computer readable medium are included. Some embodiments include receiving logic configured to receive, at a first communications device, without a prior request to send (RTS) signal being sent, a first clear to send (CTS) signal from a second communications device, addressed to the first communications device, the CTS signal indicating a data exchange duration and first sending logic configured to send a second CTS signal, from the first communications device, to the second communications device.

Additionally, embodiments of a system are included. Some embodiments include means for receiving, at a first communications device, without a prior request to send (RTS) signal being sent, a first clear to send (CTS) signal from a second communications device, addressed to the first communications device, the CTS signal indicating a data exchange duration and means for sending a second CTS signal, from the first communications device, to the second communications device.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 2 depicts a functional block diagram illustrating a communications device, similar to the communications device 102 from FIG. 1.

FIG. 3A depicts a flow diagram illustrating an exemplary embodiment of a data exchange between two communications devices, such as in the network configuration of FIG. 1.

FIG. 3B depicts a flow diagram illustrating an exemplary embodiment of a communication of a clear to send (CTS) signal followed by a request to send (RTS) signal, similar to the diagram from FIG. 3A.

FIG. 3C depicts a flow diagram illustrating an exemplary embodiment of a broadcast CTS being received at a communications device, similar to the diagram from FIG. 3B.

FIG. 3D depicts a flow diagram illustrating an exemplary embodiment of a plurality of CTS signals being sent, in response to a received CTS signal, similar to the diagram from FIG. 3C.

DETAILED DESCRIPTION

Embodiments disclosed herein may be configured to transmit a frame addressed to a recipient, followed by the RTS message addressed to the same recipient, wherein the endpoint of the duration field of a request to send (RTS) does not exceed that of a clear to send (CTS). Similarly, some embodiments may be configured to transmit a clear to send (CTS) message addressed to a recipient, which is not a response to an RTS from that recipient. In response, the recipient may transmit a CTS back to the sender of the first CTS.

Similarly, some embodiments may be configured to transmit a CTS addressed to the node and transmit a following RTS to the same recipient (referred to as a CTS-to-AP if the addressee is an access point). The CTS-to-AP configuration may be configured to set a non-resetting NAV (because updated from a CTS) at the other devices but not at the addressed node (e.g., the access point), so that the addressed device can still respond to a following RTS. The RTS does not update the NAV at stations other than the addressed recipient when the endpoint of the duration field does not exceed that of the preceding CTS. This means that surrounding devices can not reset their NAV if those devices do not receive a valid physical layer (PHY) header within a certain time after hearing the RTS. So after the CTS-to-AP/RTS/CTS exchange, there may be no need to transmit a frame that can be decoded by the surrounding stations, which is what happens, for instance, when Dual CTS is used (as described in 802.11 n draft 2.0 section 9.2.5.5a).

Figure 1:
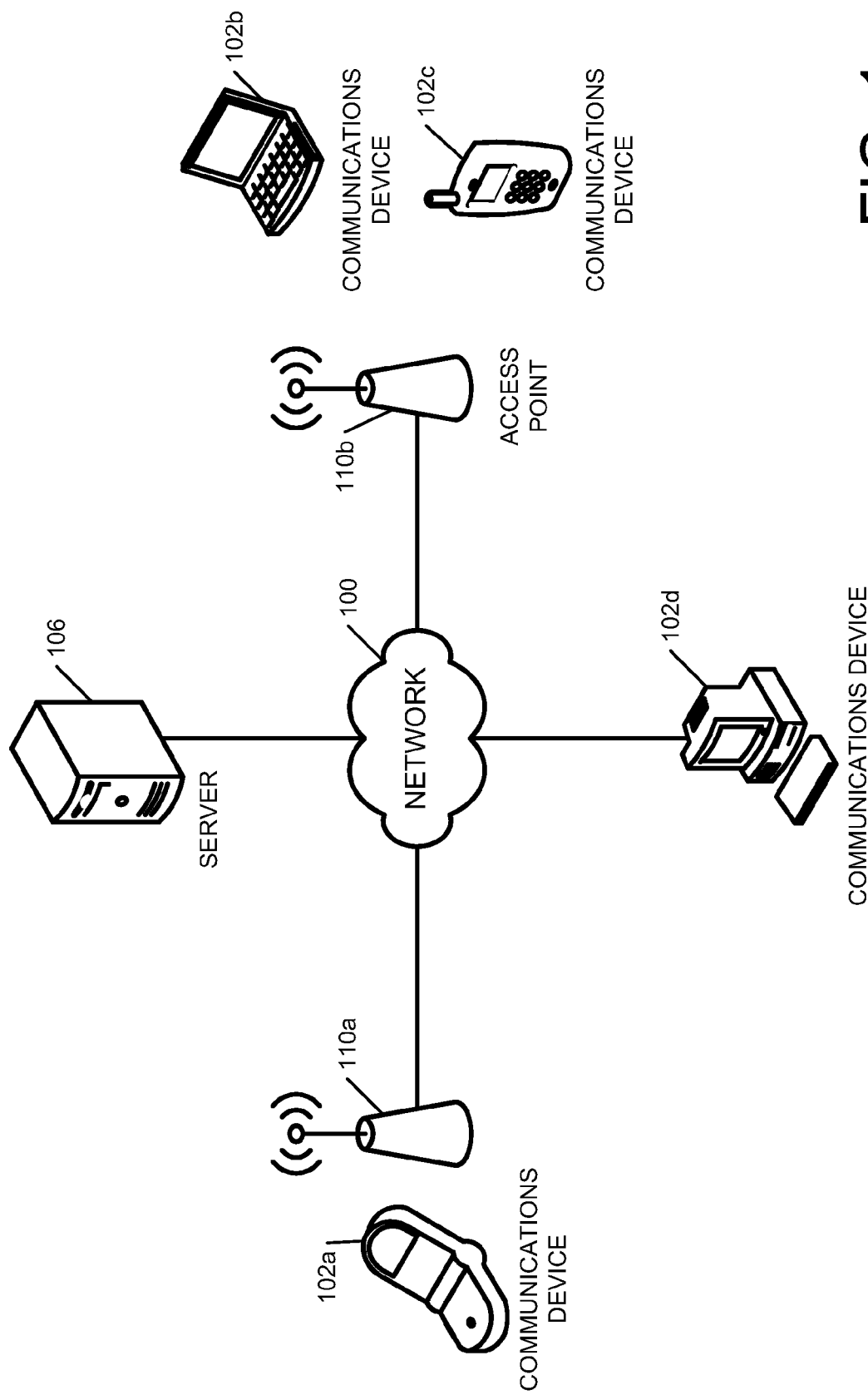
FIG. 1 depicts a diagram illustrating an exemplary embodiment of a network configuration that may be utilized for wireless communications.

Referring now to the drawings, FIG. 1 depicts a diagram illustrating an exemplary embodiment of a network configuration that may be utilized for wireless communications. As illustrated in the nonlimiting example from FIG. 1, network 100 may be coupled to access points 110a and 110b. The access points 110a and 110b can be configured to provide wireless communications to communications devices 102a, 102b, 102c and/or 102d. More specifically, depending on the particular configuration, access points 110a and/or 110b may be configured for providing voice over internet protocol (VoIP) services, wireless fidelity (WIFI) services, WiMAX services, wireless session initiation protocol (SIP) services, bluetooth services and/or other wireless communication services. Additionally coupled to the network 100 is a server 106. The server 106 may be configured as a web server, SIP server, and/or other type of server.

The network 100 may include a public switched telephone Network (PSTN), an integrated services digital Network (ISDN), the Internet, a cellular network, and/or other mediums for communicating data between communication devices. More specifically, as a nonlimiting example, while the communications devices 102a and 102d may be configured for WIFI communications, communications devices 102c, 102d, and/or 106 may be coupled to the network 100 and may be configured for VoIP communications, bluetooth communications, WIFI communications, and/or other wireline and/or wireless communications.

FIG. 2 depicts a functional block diagram illustrating a communications device, similar to the communications device 102 from FIG. 1. As illustrated in FIG. 2, in terms of hardware architecture, the communications device 102 may include a processor 282, a memory component 284, a display interface 294, a data storage component 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a hardware device for executing software, particularly software stored in the memory component 284.

The processor 282 can be any custom made or commercially available processor, a central processing unit (CPU), an auxiliary processor among several processors associated with the communications device 102, a semiconductor based microprocessor (in the form of a microchip or chip set), a macroprocessor, or generally any device for executing instructions.

The memory component 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory component 284 may incorporate electronic, magnetic, optical, and/or other types of storage media. Note that the memory component 284 can also have a distributed architecture, where various components are situated remotely from one another, but can be accessed by the processor 282.

The software in the memory component 284 may include one or more separate programs, each of which includes an ordered listing of executable instructions for implementing logical functions. In the example of FIG. 2, the software in the memory component 284 may include communications logic 288, as well as an operating system 286. As illustrated, the communications logic 288 may include receiving logic 290 configured to receive, at a first communications device, without a prior request to send (RTS) signal being sent, a first clear to send (CTS) signal from a second communications device, addressed to the first communications device, the CTS signal indicating a data exchange duration. Also included is sending logic 293 configured to send a second CTS signal, from the first communications device, to the second communications device. Other components may also be included.

Additionally, while the logic components 290 and 293 are each illustrated in this nonlimiting example as a single piece of logic, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be construed as a source program, executable program (object code), script, and/or any other entity that includes a set of instructions to be performed. When constructed as a source program, the program is translated via a compiler, assembler, interpreter, or the like, which may or may not be included within the volatile and nonvolatile memory 284, so as to operate properly in connection with the operating system 286.

The input/output devices that may be coupled to system I/O Interface(s) 296 may include input devices, for example but not limited to, a keyboard, mouse, scanner, microphone, camera, proximity device, receiver, etc. Further, the input/output devices may also include output devices, for example but not limited to, a printer, display, transmitter, etc. The input/output devices may further include devices that communicate both as inputs and outputs, for instance but not limited to, a modulator/demodulator (modem for accessing another device, system, or network), a radio frequency (RF) or other transceiver, a telephonic interface, a bridge, a router, WIFI communications device, WiMAX communications device, bluetooth communications device, etc. Similarly, a network interface 298, which is coupled to local interface 292, can be configured to communicate with a communications network, such as the network from FIG. 1. While this communication may be facilitated via the communications device 102, this is not a requirement.

More specifically, the network interfaces 298 may be configured for facilitating communication with one or more other devices. The network interface 298 may include any component configured to facilitate a connection with another device. While in some embodiments, among others, the client device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the client device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces. In operation, the wireless network interfaces 298 may be configured to communicate with other client devices 102, access points 110, and other wireless devices via a wireless local area network (WLAN) or other wireless network.

If the communications device 102 is a personal computer, workstation, or the like, the software in the memory component 284 may further include a basic input output system (BIOS) (omitted for simplicity). The BIOS is a set of software routines that initialize and test hardware at startup, start the Operating System 286, and support the transfer of data among the hardware devices. The BIOS is stored in ROM so that the BIOS can be executed when the communications device 102 is activated.

When the communications device 102 is in operation, the processor 282 can be configured to execute software stored within the memory component 284, to communicate data to with the memory component 284, and to generally control operations of the communications device 102 pursuant to the software. Software in memory 284, in whole or in part, may be read by the processor 282, perhaps buffered within the processor 282, and then executed. Additionally, one should note that while the above description is directed to a communications device 102, other devices can also include the components described in FIG. 2.

One should note that the access point 110 (which may also be seen as a communications device) can be configured with one or more of the components and/or logic described above with respect to the communications device 102. Additionally, the access point 110, the communications device 102, and/or other components of FIG. 1 can include other components and/or logic for facilitating the operations described herein. Additionally, depending on the particular configuration, the access point 110 may include both a wireless interface for communicating to the client devices and a second interface for communicating with the network. The access point 110 may be combined with other network services, (e.g., network address translation (NAT), dynamic host control protocol (DHCP), routing, firewall).

FIG. 3A depicts a flow diagram illustrating an exemplary embodiment of a data exchange between two communications devices, such as in the network configuration of FIG. 1. As illustrated in the nonlimiting example of FIG. 3A, the communications device 102c may be configured to send a CTS-to-Self signal 302 to an access point 110. The CTS-to-Self message 302 may be a CTS that is sent by a communications device 102 and addressed to the communications device 102 that send the CTS. The CTS signal 302 may be broadcast to and received by a plurality of communications devices, including the access point 110. Upon receiving the CTS-to-Self signal 302, the access point 110 can set a network allocation vector (NAV) 304 that indicates a time for data exchange. The NAV 304 may be set for a plurality of devices, however this is not a requirement.

Additionally, the communications device 102c can send a request to send (RTS) signal 306 to the access point 110. However, because of the rules of the IEEE 802.11 protocol, the access point 110 may be unable to respond.

One should note that, while the above listed exchange occurs between a communications device 102c and an access point 110, this is a nonlimiting example. More specifically, the data exchanges disclosed herein may involve any of communications device (e.g., communications devices 102, server 106, and/or access point 110).

FIG. 3B depicts a flow diagram illustrating an exemplary embodiment of a communication of a clear to send (CTS) signal followed by a request to send (RTS) signal, similar to the diagram from FIG. 3A. As illustrated in the nonlimiting example of FIG. 3B, the communications device 102c can transmit a CTS signal 308 (or other short frame that does not require a response), addressed to the communications device 102a. Additionally, followed by the CTS signal 308, the communications device 102c can transmit an RTS signal 310 addressed to communications device 102a ("A"). The CTS signal 308 may be configured to set a non-resetting NAV with other communications devices (not shown) who may receive the CTS. The communications device 102a may send a CTS signal 314 addressed to communications device 102c, indicating that a transmission channel is clear to send data. The communications device 102c can then send the data 316. The data 316 can use a PHY header, which may not be backward compatible with nearby legacy devices, because the nearby legacy devices set a NAV based on the receipt of the CTS 308 and/or CTS 314, which (in at least one exemplary embodiment) cannot be reset.

FIG. 3C depicts a flow diagram illustrating an exemplary embodiment of a broadcast CTS being received at a communications device, similar to the diagram from FIG. 3B. As illustrated in the nonlimiting example of FIG. 3C, the access point 110 may send an unsolicited CTS signal 318, addressed to communications device 102a. As discussed above, according to IEEE 802.11 protocol, a communications device that receives an unsolicited CTS cannot respond to the received signal. However, if a change in IEEE 802.11 protocol occurs (and/or if operating in an non-IEEE 802.11 environment), the communications device 102a can send a CTS 322 addressed to the access point 110 in response to receipt of an unsolicited CTS addressed at the device 102a. The access point 110 can then transmit data 324 to the communications device 102a. In this exemplary frame exchange, the unsolicited CTS 318 replaces the RTS in an RTS/CTS exchange, so that a NAV can be set in the network, which does not reset according to the NAV reset rules of the IEEE 802.11 protocol.

FIG. 3D depicts a flow diagram illustrating an exemplary embodiment of a plurality of CTS signals being sent, in response to a received CTS signal, similar to the diagram from FIG. 3C. As illustrated in the nonlimiting example of FIG. 3D, the communications device 102c can send an unsolicited CTS 326 to the access point 110. The access point 110 can then send two CTS messages 330, 332 to the communications device 102c. The first CTS message 330 may be transmitted at a first modulation (e.g., for short range transmission). Similarly, the second CTS message 332 may be transmitted at a second modulation (e.g., for longer range transmission). The communications device 102c can then send data 334 to the access point 110. The second CTS response message 332 may have a PHY header that (in at least one embodiment) cannot be decoded by legacy stations, which will not reset a NAV at the legacy stations, because the NAV was set by a CTS.

Figure 4:
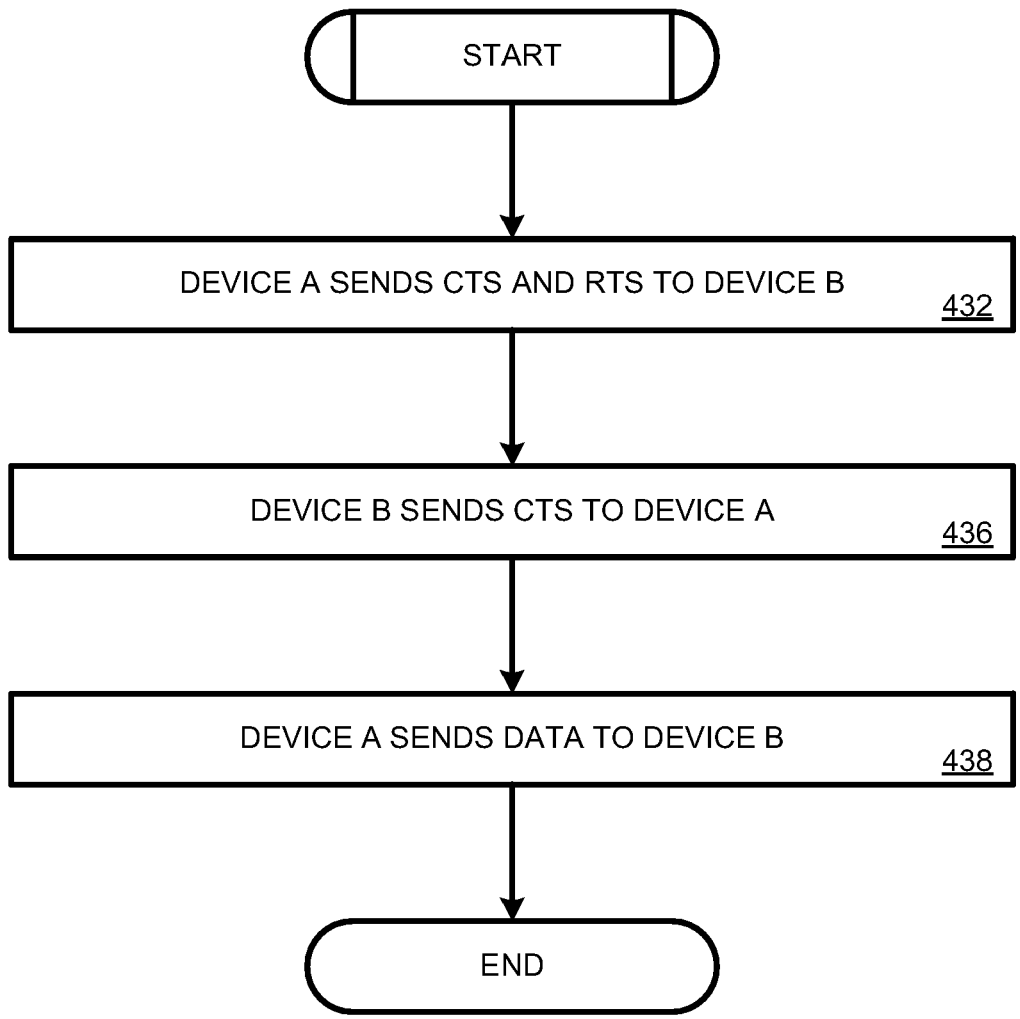
FIG. 4 depicts a flowchart illustrating an exemplary embodiment of a process for sending a clear to send (CTS) signal followed by a request to send (RTS) signal, similar to the diagram from FIG. 3B.

FIG. 4 depicts a flowchart illustrating an exemplary embodiment of a process for sending a clear to send (CTS) signal followed by a request to send (RTS) signal, similar to the diagram from FIG. 3B. As illustrated in the nonlimiting example of FIG. 4, the communications device 102a can send a CTS and an RTS to the communications device 102b (block 432). The communications device 102b can then send a CTS to the communications device 102a (block 436). The communications device 102a can then send data to the communications device 102b (block 438).

Figure 5:
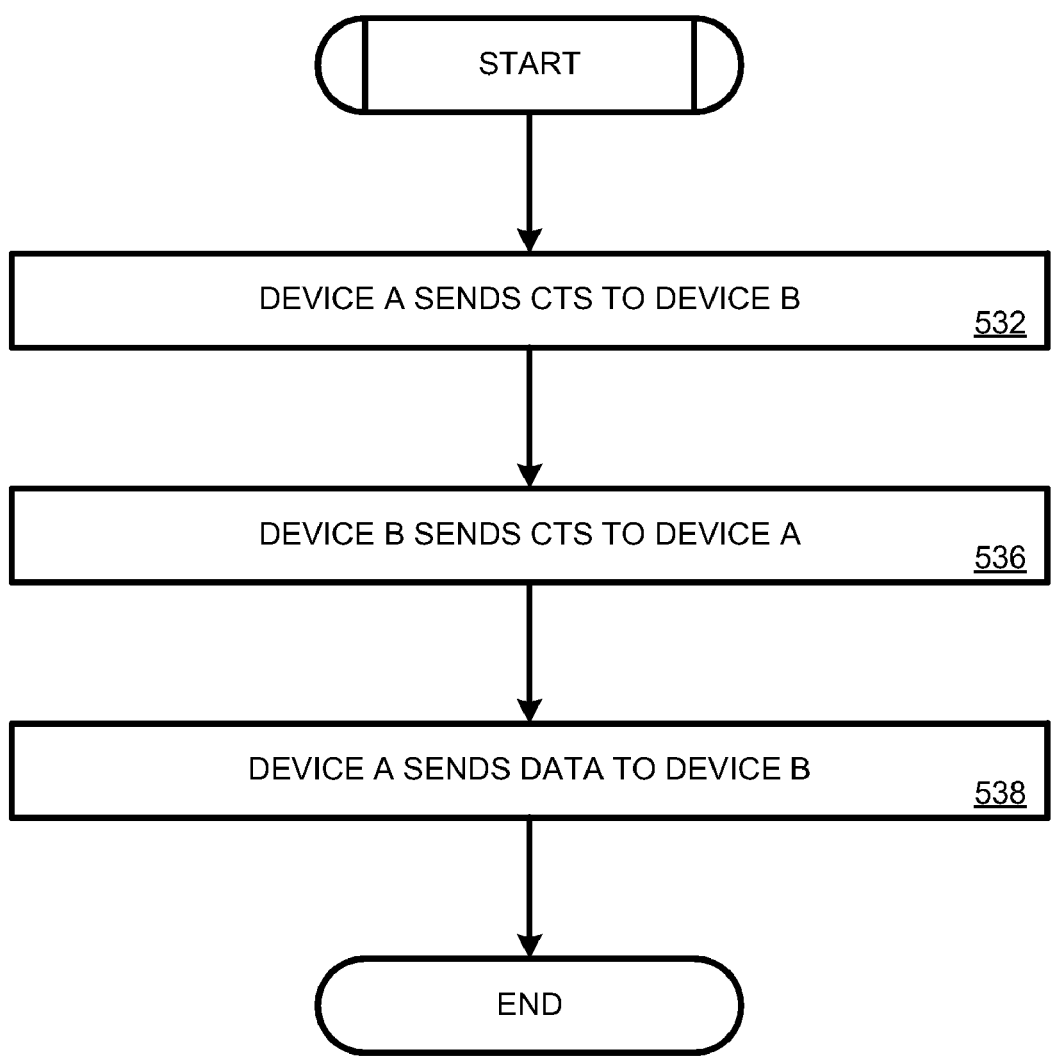
FIG. 5 depicts a flowchart illustrating an exemplary embodiment of a process for sending a broadcast CTS that is received at a communications device, similar to the diagram from FIG. 3C.

FIG. 5 depicts a flowchart illustrating an exemplary embodiment of a process for sending a broadcast CTS that is received at a communications device 102, similar to the diagram from FIG. 3C. As illustrated in the nonlimiting example of FIG. 5, the communications device 102a can send a CTS to the communications device 102b (block 532). The communications device 102b can additionally send a CTS to the communications device 102a (block 536). The communications device 102a can then send data to the communications device 102b (block 538).

Figure 6:
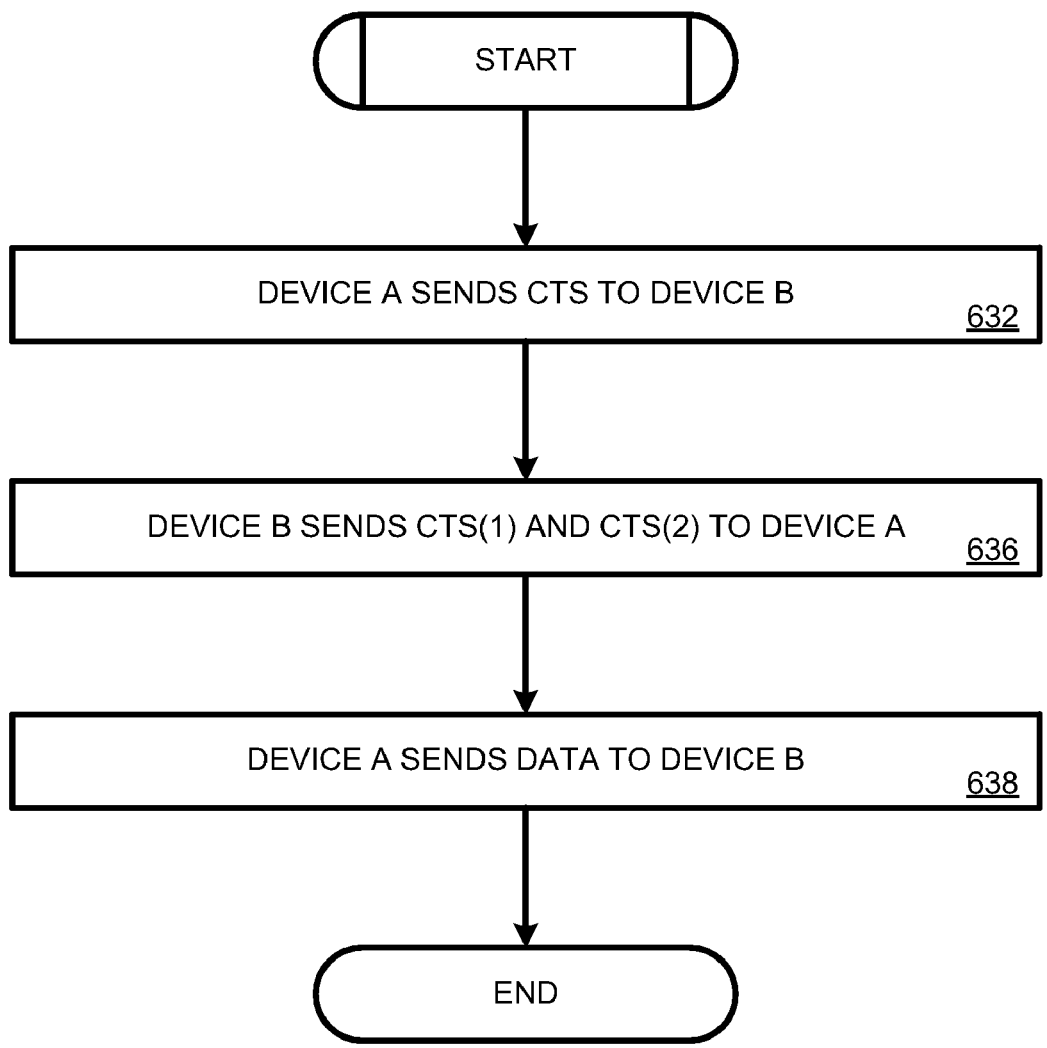
FIG. 6 depicts a flowchart illustrating an exemplary embodiment of a process for sending a plurality of CTS signals, in response to a received CTS signal, similar to the diagram from FIG. 3D.

FIG. 6 depicts a flowchart illustrating an exemplary embodiment of a process for sending a plurality of CTS signals, in response to a received unsolicited CTS signal, similar to the diagram from FIG. 3D. As illustrated in the nonlimiting example of FIG. 6, the communications device 102a can send a CTS to the communications device 102b (block 632). The communications device 102b can send a first CTS and a second CTS to the communications device 102a (block 636). The communications device 102a can then send data to the communications device 102b (block 638).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method, comprising:
receiving, at a first communications device, without a prior request to send (RTS) signal being sent, a first clear to send (CTS) signal from a second communications device, addressed to the first communications device, the CTS signal indicating a data exchange duration; and
sending a second CTS signal, from the first communications device, to the second communications device,
wherein a network allocation vector (NAV) is set by at least one other communications device, further comprising receiving, at the first communications device, a request to send (RTS) signal that directly follows the first CTS signal, the RTS signal directly following the first CTS signal is addressed to the first communications device, the RTS signal indicating a data exchange duration that does not exceed the data exchange duration of the first CTS signal.

2. The method of claim 1, further comprising sending, by the second communications device, payload data to the first communications device.

3. The method of claim 1, further comprising sending a third CTS signal from the first communications device to the second communications device, the third CTS signal being sent directly after the second CTS signal.

4. The method of claim 3 wherein the second CTS is configured at a first modulation and the third CTS is configured at a second modulation.

5. The method of claim 1, wherein the NAV is configured to be non-resetting at the at least one other communications device.

6. The method of claim 1, further comprising:
sending, by the second communications device, payload data to the first communications device, the NAV is configured to be non-resetting at the at least one other communications device.

7. The method of claim 1, further comprising:
sending, by the second communications device, payload data to the first communications device;
sending a third CTS signal from the first communications device to the second communications device, the third CTS signal being sent directly after the second CTS signal, the second CTS is configured at a first modulation and the third CTS is configured at a second modulation, wherein the NAV is configured to be non-resetting at the at least one other communications device.

8. A non-transitory computer readable medium, comprising:
first receiving logic configured to receive, at a first communications device, without a prior request to send (RTS) signal being sent, a first clear to send (CTS) signal from a second communications device, addressed to the first communications device, the CTS signal indicating a data exchange duration; and first sending logic configured to send a second CTS signal, from the first communications device, to the second communications device, further comprising second receiving logic configured to receive, at the first communications device, a request to send (RTS) signal that directly follows the first CTS, the RTS directly following the first CTS signal is addressed to the first communications device, the RTS indicating a data exchange duration that does not exceed the data exchange duration of the first CTS.

9. The computer readable medium of claim 8, further comprising third receiving logic configured to receive, by the first communications device payload data from the second communications device.

10. The computer readable medium of claim 8, further comprising second sending logic configured to send a third CTS signal from the first communications device to the second communications device, the third CTS signal being sent directly after the second CTS signal.

11. The computer readable medium of claim 10 wherein the second CTS is configured at a first modulation and the third CTS is configured at a second modulation.

12. The computer readable medium of claim 8, wherein the NAV is configured to be non-resetting at the at least one other communications device.

13. A system, comprising:
means for receiving, at a first communications device, without a prior request to send (RTS) signal being sent, a first clear to send (CTS) signal from a second communications device, addressed to the first communications device, the CTS signal indicating a data exchange duration; and means for sending a second CTS signal, from the first communications device, to the second communications device, wherein a network allocation vector (NAV) is set by at least one other communications device, means for receiving, at the first communications device, a request to send (RTS) signal that directly follows the first CTS signal, the RTS directly following the first CTS signal is addressed to the first communications device, the RTX indicting a data exchange duration that does not exceed the data exchange duration of the first CTS.

14. The system of claim 13, further comprising means for receiving, by the first communications device, payload data from the second communications device.

15. The system of claim 13, further comprising means for sending a third CTS signal from the first communications device to the second communications device, the third CTS signal being sent directly after the second CTS signal.

16. The system of claim 15, wherein the second CTS is configured at a first modulation and the third CTS is configured at a second modulation.

17. The system of claim 13, further comprising:
means for receiving, by the first communications device, payload data from the second communications device; and means for sending a third CTS signal from the first communications device to the second communications device, the third CTS signal being sent directly after the second CTS signal.

18. A method, comprising:
receiving, at a first communications device, without a prior request to send (RTS) signal being sent, a first clear to send (CTS) signal from a second communications device, addressed to the first communications device, the CTS signal indicating a data exchange duration;

sending a second CTS signal, from the first communications device, to the second communications device, and a network allocation vector (NAV) is set by at least one other communications device;

receiving, at the first communications device, a request to send (RTS) signal that directly follows the first CTS signal, the RTS signal directly following the first CTS signal is addressed to the first communications device, the RTS signal indicating a data exchange duration that does not exceed the data exchange duration of the first CTS signal;

sending, by the second communications device, payload data to the first communications device; and sending a third CTS signal from the first communications device to the second communications device, the third CTS signal being sent directly after the second CTS signal.

19. The method of claim 18 wherein the second CTS is configured at a first modulation and the third CTS is configured at a second modulation.

20. The method of claim 18, wherein the NAV is configured to be non-resetting at the at least one other communications device.

\* \* \* \* \*